US008408325B2

(12) United States Patent
Kapfer

(10) Patent No.: US 8,408,325 B2
(45) Date of Patent: Apr. 2, 2013

(54) HYDRAULIC UPPER LINK WITH FLOAT POSITION

(75) Inventor: Johannes Kapfer, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 562 days.

(21) Appl. No.: 12/102,366

(22) Filed: Apr. 14, 2008

(65) Prior Publication Data

US 2008/0264656 A1 Oct. 30, 2008

(30) Foreign Application Priority Data

Apr. 16, 2007 (DE) .................. 10 2007 017 784

(51) Int. Cl.
*A01B 59/06* (2006.01)
(52) U.S. Cl. ........................................ 172/439; 172/663
(58) Field of Classification Search .................. 172/439
See application file for complete search history.

(56) References Cited

U.S. PATENT DOCUMENTS

| 2,880,812 | A | * | 4/1959 | Morse | 172/460 |
| 2,949,894 | A | * | 8/1960 | Hewitt | 91/417 R |
| 2,970,655 | A | * | 2/1961 | Acton | 172/316 |
| 2,996,126 | A | * | 8/1961 | Voegeli | 172/272 |
| 3,145,781 | A | * | 8/1964 | Rogler | 172/810 |
| 3,561,789 | A | * | 2/1971 | Stikeleather et al. | 172/272 |
| 3,572,763 | A | | 3/1971 | Cannon et al. | |
| 3,736,845 | A | | 6/1973 | Weiste et al. | |
| 3,905,425 | A | | 9/1975 | Jackson | |
| 4,191,280 | A | * | 3/1980 | Copperwheat | 188/300 |
| 4,268,007 | A | * | 5/1981 | Chittenden | 251/30.02 |
| 4,825,958 | A | * | 5/1989 | Kelderman | 172/413 |
| 6,478,094 | B2 | * | 11/2002 | Alexander et al. | 172/439 |
| 7,926,247 | B2 | * | 4/2011 | Van Den Engel | 56/15.9 |
| 2001/0007399 | A1 | | 7/2001 | Adamek et al. | |

FOREIGN PATENT DOCUMENTS

| DE | 1286609 | 8/1972 |
| DE | 2025040 A | 8/1972 |
| DE | 2206195 A1 | 7/1973 |
| DE | 3218385 C2 | 8/1988 |

OTHER PUBLICATIONS

German Examination Report of DE 102007017784.6.
German Examination Report for related German Application No. 10 2007 017 784.6 dated Mar. 28, 2008.
European Search Report for EP08005753.
European Written Opinion for EP08005753.

* cited by examiner

*Primary Examiner* — Thomas B Will
*Assistant Examiner* — Joel F. Mitchell

(57) ABSTRACT

An upper link for a utility vehicle, in particular for an agricultural tractor having a hydraulic cylinder (34) for adjusting the upper link (32) and at least one fluid tank (36), to which the hydraulic cylinder (34) can be coupled, so that in a coupled condition, hydraulic fluid limited to a pre-determined volume can be exchanged between the hydraulic cylinder (34) and the fluid tank (36), and so that a piston (40) of the hydraulic cylinder (34) can move in floating fashion by a distance ($l_s$) corresponding to the pre-determined volume in the hydraulic cylinder (34). The present invention further includes a front-end as well as to a back-end three-point hitch of a utility vehicle with two pivotally connected lower links and an upper link with such a fluid tank.

9 Claims, 9 Drawing Sheets

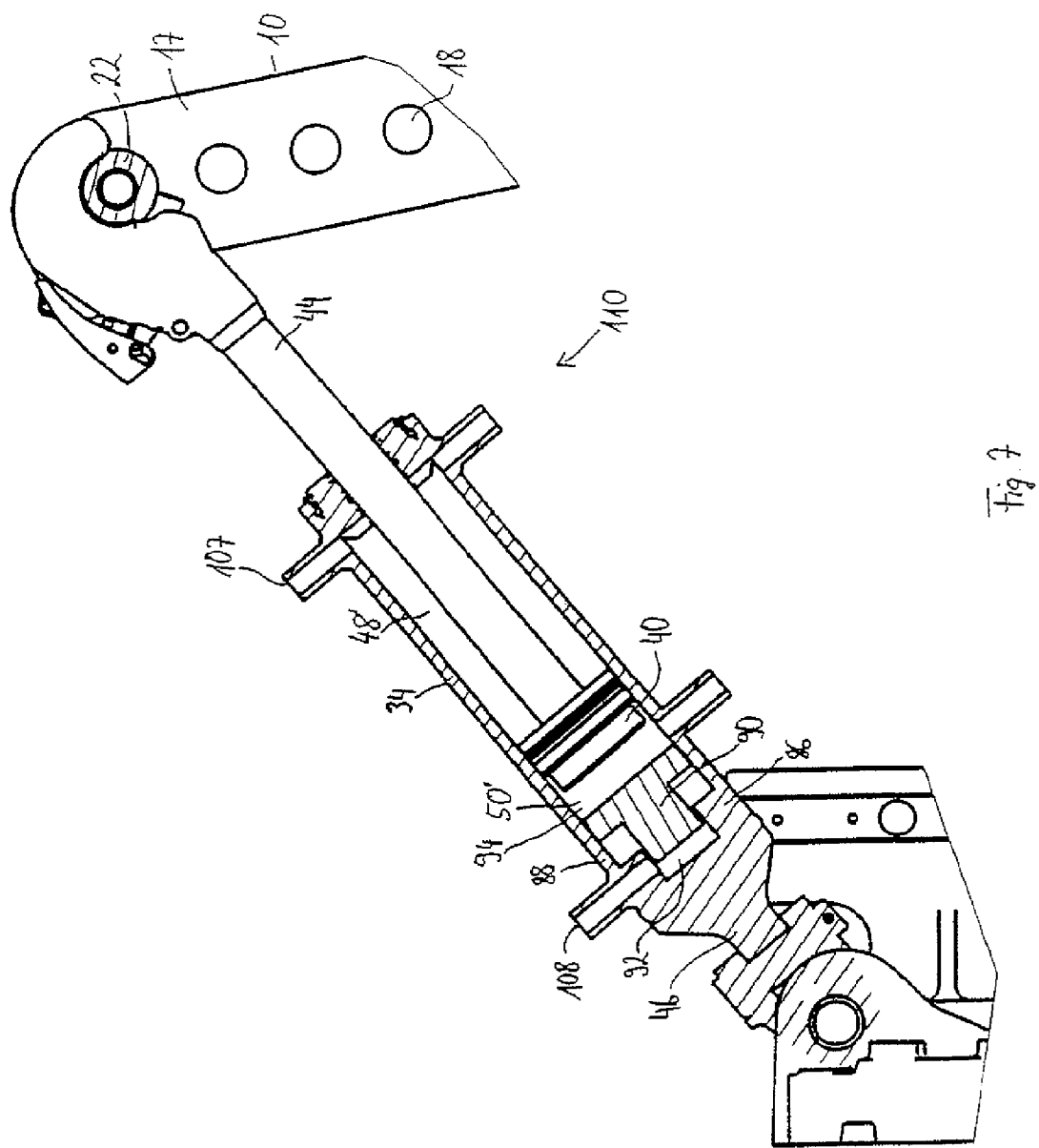

HYDRAULIC UPPER LINK WITH FLOAT POSITION

CROSS REFERENCE TO RELATED APPLICATION

This application is based on, and claims the benefit of priority to, German application 10 2007 017 784.6, filed 16 Apr. 2007, which priority application is hereby incorporated by reference.

BACKGROUND OF THE INVENTION

1. Field of Invention

The present invention relates to an upper link for a utility vehicle, in particular for an agricultural tractor, wherein the upper link has a hydraulic cylinder for adjusting the upper link. Furthermore the present invention relates to a back-end and a front-end three-point hitch of a utility vehicle as well as to a utility vehicle with such a back-end and/or front-end mounted upper link.

2. Description of Related Art

Utility vehicles, in particular agricultural utility vehicles, such as for example an agricultural tractor, on the back-end and/or front-end often have a three-point hitch for attaching equipment. Such equipment may be an agricultural implement, such as for example a plough.

FIGS. 1 and 2 show a back-end three-point hitch with a conventional upper link. FIG. 1 is a perspective view of the conventional three-point hitch from the right in the driving direction and FIG. 2 shows a perspective view of the conventional three-point hitch from the left in the driving direction.

As is evident from FIGS. 1 and 2, the three-point hitch 2 is mounted on the back-end of the transmission. The three-point hitch 2 is formed by two lower links 6 and an upper link 8. The lower links 6 and the upper link 8 with their respective proximal end 6a or 8a are connected to the transmission case 4 (or possibly to chassis components). The distal ends 6b or 8b in each case have coupling elements 6c or 8c, which serve for coupling to a tool-carrying frame 10. The tool-carrying frame 10 for example forms part of a rear-mounted implement for back-end attachment to the utility vehicle, such as for example an agricultural plough. Here the sections of the lower links 6 and the upper link 8 which are arranged on the transmission case 4 are called "proximal", while the sections remote from the transmission case 4 are called "distal".

The lower links 6 are designed so as to actively pivot up and down. For this purpose the lower links 6 are connected to lift rods 11, which extend upwards from the lower links and with their upper end in turn are connected to elbow levers 12. As is generally known in this specialist area of engineering the elbow levers 12 can be pivoted by lift cylinders 14, as a result of which the lower links are raised or lowered. In the horizontal direction the lower links are designed so as to pivot back and forth to a limited extent or are rigid. The pendulum movement can be blocked by means of a control device. This blocking of the pendulum movement is activated primarily if the attachment has no contact with the ground. The upper link 8 can be likewise pivoted upwards and downwards about a linkage point 8a on the transmission case 4. Furthermore the length of the upper link 8 can be adjusted by a hydraulic cylinder 16.

Alternatively it is customary with conventional upper links that the lengthwise adjustment of the upper link is effected mechanically by means of a corresponding screw connection. By contrast the hydraulic adjustment of the upper link has the advantage that the upper link can also be adjusted under load.

In mechanical adjustment (by screw adjustment) the upper link must be disengaged. Another disadvantage of mechanical adjustment is the susceptibility, in particular of the partially exposed adjustment thread, to contamination due to whirled up dust and thrown up earth. Furthermore provision of a hydraulic cylinder 16 has the advantage that the lengthwise adjustment of the upper link 8 can be controlled from the vehicle seat.

The tool-carrying frame 10 has two upwardly extending supports 17, which in each case are provided with drilled holes 18 in the form of borings. The drilled holes 18 here are arranged at different heights. In each case two drilled holes 18 are aligned with each other. Two elongated holes 20, which are aligned with each other and whose longitudinal direction runs transversely to the extension direction of the supports 17, are provided above the drilled holes 18 in the supports 17.

As is evident from FIGS. 1 and 2 the tool-carrying frame 10 is conventionally mounted on the three-point hitch 2 so that a lower part of the tool-carrying frame 10 is connected to the two coupling elements 6c of the lower links 6, while an upper part of the tool-carrying frame 10, in particular the two upper supports 17, is connected to the upper link 8. The lower part of the tool-carrying frame 10 in the present example is in the form of a transverse bar 24, while the coupling elements 6c of the lower links 6 are designed as hooks. In addition locking elements 6d, which engage above the bar 24 and thus prevent the transverse bar 24 from uncoupling, are provided on the hooks.

In order to connect the upper link 8 to the tool-carrying frame 10 a pin 22 is guided through a desired pair of drilled holes 18 or through the pair of elongated holes 20 and the coupling element 8c of the upper link 8 is hung on the pin. Similar to the lower links 6 the upper link 8 also has a hook, which is hung on the pin 22 from above, and (not illustrated) an engaging element, which prevents the hook uncoupling from the pin 22.

In principle, depending on the coupling variant of the upper link 8, two modes of operation are possible. On the one hand the tool-carrying frame 10 can be rigidly coupled to the upper link 8 (and also to the lower links 6). For this purpose the pin 22 is guided through a pair of drilled holes 18 and the upper link 8, as described above, is hung on the pin 22. This mode of operation is designated in the following as "rigid coupling to the upper link 8". On the other hand a mode of operation is possible, wherein limited relative movement between the tool-carrying frame 10 and the upper link 8 is permitted. For this purpose the pin 22 is guided through the pair of elongated holes 20 and the upper link 8, as described above, is hung on the pin 22. This mode of operation is designated in the following as "upper link float position". These two modes of operation are discussed below in detail.

In the mode of operation with rigid coupling to the upper link 8, a desired height of the coupling point of the upper link 8 can be set since the drilled holes 18 are provided at different heights. Relative movement of the tool-carrying frame 10 in relation to the lower links 6 and the upper link 8 is not possible with this mode of operation. Only the lower links 6 and the upper link 8 can move to a certain degree as known from the prior art.

The mode of operation with upper link float position is advantageous for some applications. In this mode of operation the three-point hitch 2 permits limited pivot movement upwards and downwards of the tool-carrying frame 10 and thus of the rear-mounted implement. This mode of operation is desirable particularly if the rear-mounted implement is pulled by the utility vehicle over bumps in the ground and therefore the angle position between the utility vehicle and the rear-mounted implement varies relative to the upwards and downwards direction. Even if the rear-mounted implement is raised from the utility vehicle, it may happen that due to bumps the rear-mounted implement makes contact with the ground and as a result is raised still further. This can occur for example when driving off the field with raised plough.

In order in such cases to avoid damaging or upsetting the rear-mounted implement or the three-point hitch 2, a pivot movement of the tool-carrying frame 10 about the suspension on the lower links 6 and in particular about the pivot axis s illustrated in FIGS. 1 and 2 is permitted in the mode of operation with upper link float position. In the case of the prior art tool-carrying frames 10 the long holes 22 are provided for this purpose. As a result of the movement of the pin 22 in the elongated holes 20 limited pivot movement of the tool-carrying frame 10 about the pivot axis s is permitted.

The problem with the prior art coupling of the upper link 8 to the elongated holes 20 is that this can only be done at one height. A desired height of the upper coupling point of the upper link 8 can only be set using the drilled holes 18 and therefore in the mode of operation with rigid coupling to the upper link. Furthermore up until now change-over between the mode of operation with rigid coupling to the upper link and the mode of operation with upper link float position has been comparatively time-consuming and must be done by hand. The connection between upper link 8 and tool-carrying frame 10 must be disengaged for the change-over, which means that the implement attached to the tool-carrying frame 10 must be demounted. After the change-over, settings, such as for example the distance of the implement from the ground and its inclination, must be re-adjusted accordingly. Furthermore the driver, for manual change-over, must leave the driver's seat of the utility vehicle and place the pin 22 in the desired drilled holes 18 or in the two elongated holes 20.

On the basis of FIGS. 1 and 2 a conventional back-end three-point hitch for attaching a back-end implement has been described by way of example. In this specialist area of engineering it is well-known that a front-end conventional three-point hitch for attaching a front-end implement is designed in the corresponding way.

An upper link, whose length can be adjusted manually, is described in German Patent DE 41 35 809 C1 for example. An agricultural implement, which can be attached to the front three-point hitch of a tractor, wherein an elongated hole is provided in order to permit limited pivoting of the implement, is described in German Patent DE 30 22 887 A1.

Consequently the object of the present invention consists in providing an upper link float position so that change-over between a mode of operation with upper link float position and a mode of operation with rigid coupling to the upper link can be done under load and the implement does not have to be demounted for this.

The object is achieved by an upper link according to Claim 1. Further embodiments of the invention are indicated in the sub-claims.

BRIEF SUMMARY OF THE INVENTION

According to the invention an upper link is made available for a utility vehicle, in particular for an agricultural tractor, wherein the upper link has a hydraulic cylinder for adjusting the upper link. The hydraulic cylinder in this case can be coupled to at least one fluid tank so that in the coupled condition hydraulic fluid limited to a pre-determined volume can be exchanged between the hydraulic cylinder and the fluid tank and so that a piston of the hydraulic cylinder can be moved in floating fashion by a distance corresponding to the pre-determined volume in the hydraulic cylinder.

Movement in "floating fashion" means that the piston can be moved in the hydraulic cylinder, without for this purpose fluid pressure from a power source of the utility vehicle, such as for example a hydraulic pump of the utility vehicle, being actively exerted on the piston. The float position of the upper link makes it possible, when driving over bumps in the ground with the rear-mounted implement lowered and also if the raised rear-mounted implement makes contact with bumps, for a pivot movement of the rear-mounted implement and in particular the tool-carrying frame 10 relative to the utility vehicle to be allowed. In particular the piston, upon outside exertion of force, which is transmitted thereto via the tool-carrying frame 10, can move by the distance corresponding to the pre-determined volume in the hydraulic cylinder. As a result the upper link is moved to a limited degree upon outside exertion of force and therefore can absorb the relative movement between tool-carrying frame 10 and utility vehicle.

As a result of the upper link according to the invention a change-over between a mode of operation with upper link float position and a mode of operation with rigid coupling to the upper link can be done without the connection between the upper link and the tool-carrying frame having to be disengaged. Thus the implement does not have to be demounted specially for this. A further advantage of the present invention lies in the fact that the float position of the upper link can be provided on the side of the utility vehicle and thus independently of the attached implement. Furthermore it is not necessary to provide an elongated hole on the tool-carrying frame. Because the float position of the upper link is made available by corresponding design of the upper link itself, the drilled holes provided at different heights or parts elsewhere of the tool-carrying frame to be coupled can be used on the implement side. Therefore different coupling heights of the upper link can also be adjusted in the mode of operation with upper link float position. Furthermore greater movement distances of the piston in the hydraulic cylinder can be made available in the mode of operation with upper link float position, depending on the design of the fluid tank compared to the prior art version with elongated hole.

Change-over to the upper link float position is done according to the present invention through coupling of the hydraulic cylinder to the fluid tank. Such a coupling can be comfortably controlled from the driver's seat of the utility vehicle. In particular valves, which bring about coupling of the fluid tank to the hydraulic cylinder, with a suitably laid-out configuration, can be manually reached and adjusted from the driver's seat of the vehicle. Furthermore it is possible to operate such valves electrically by means of actuating devices, which are located in the vehicle cab. Accordingly it is not necessary for the driver to leave the vehicle in order to switch on the upper link float position or to switch off the upper link float position.

According to the invention the hydraulic cylinder is coupled to the fluid tank so that in the coupled condition hydraulic fluid limited to a pre-determined volume can be exchanged between the hydraulic cylinder and the fluid tank. In the case of a single action hydraulic cylinder this means that a pre-determined volume of hydraulic fluid can flow out or in from the piston chamber of the hydraulic cylinder. Under consideration of the diameter of the piston chamber of the hydraulic cylinder the pre-determined volume corresponds to a certain distance or a certain stroke of the piston in the hydraulic cylinder. In the case of a double action hydraulic cylinder, when a certain volume of hydraulic fluid flows out from a first piston chamber, a hydraulic fluid volume corresponding to the aforesaid volume must flow into the second piston chamber, in order to make it possible for the piston to be moved in floating fashion, corresponding to the volume exchanged. Coupling to the fluid tank must follow accordingly. In the case of utility vehicles the hydraulic cylinder of the upper link is usually designed as a double action cylinder, in order to permit adjustment of the upper link in both directions by connecting with a power source.

According to a further advantageous embodiment of the invention provision is made for the coupling between the hydraulic cylinder and the fluid tank to be interrupted. Preferably the coupling and the interruption of the coupling are effected by means of a coupling valve arranged in a fluid pipe between hydraulic cylinder and fluid tank. At the same time provision is made for the coupling valve to be arranged directly on the hydraulic cylinder and/or on the fluid tank. By interrupting the coupling the length setting of the hydraulic cylinder is locked and the upper link can be operated in the mode of operation with rigid coupling to the upper link. Therefore in the case of this further embodiment it is possible to simply change over between the two modes of operation of an upper link float position and a rigid coupling to the upper link. The coupling and interruption are effected particularly simply through the coupling valve mentioned above, since depending on the position of the valve an exchange of hydraulic fluid between hydraulic cylinder and fluid tank can be permitted or prevented.

According to a further advantageous embodiment of the invention the hydraulic cylinder, for active adjustment of the same, can be connected to a power source of the utility vehicle. Preferably the power source is a hydraulic pump. In contrast to the float position of the piston, which is obtained by coupling the hydraulic cylinder to the fluid tank, the piston is actively adjusted through the connection of the hydraulic cylinder to a power source as a result of fluid pressure being applied to the piston. As a result, for example, the angle of the attached implement can be adjusted upwards and downwards and the implement can be raised after operation, e.g. for driving off the field. Preferably the connection and separation of the connection from the power source are brought about by a regulating valve arranged in a fluid pipe between hydraulic cylinder and power source. As a result the upper link can be comfortably adjusted from the vehicle seat.

According to a further advantageous embodiment provision is made for the coupling valve and the regulating valve to be coupled together or operated in unison with one another so that when the hydraulic cylinder is connected to the power source of the utility vehicle through the regulating valve the coupling between the hydraulic cylinder and the fluid tank is interrupted by the coupling valve. Thus it is possible, when the regulating valve is actuated, for adjustment of the upper link to be directly effected and not firstly hydraulic fluid having to be exchanged between the hydraulic cylinder and the fluid tank without adjustment of the upper link. Thus exact and rapid actuation of the upper link can be achieved.

According to a further advantageous embodiment of the invention the pre-determined volume of hydraulic fluid can be varied. Thus the maximum permitted pivot movement of the attached implement relative to the utility vehicle can be adjusted depending on the particular application. Preferably in this case the distance corresponding to the pre-determined volume of the piston in the hydraulic cylinder is less than the maximum distance, which the piston can be adjusted in the hydraulic cylinder. Thus excessive pivot movement between the attached implement and the utility vehicle is avoided. Preferably the fluid tank is formed by a hydraulic cylinder, which in the following is called a fluid tank hydraulic cylinder. Thus hydraulic fluid, limited to a pre-determined volume, can be exchanged between the hydraulic cylinder (of the upper link) and the fluid tank hydraulic cylinder in a simple manner. Furthermore the maximum stroke of the piston and thus the pre-determined volume of hydraulic fluid in the case of such a fluid tank hydraulic cylinder can be adjusted in a simple manner.

According to a further advantageous embodiment of the invention the hydraulic cylinder is a double action hydraulic cylinder with two piston chambers. The upper link can be adjusted by providing a corresponding regulating valve as a result of the fact that fluid pressure from the power source of the utility vehicle is applied to one of the piston chambers of the hydraulic cylinder, while the other piston chamber is relieved from pressure in a controlled way. The application and relief from pressure of the two piston chambers can be reversed by switching over the regulating valve. Thus the upper link can be adjusted in both directions. Preferably the regulating valve has a third position, in which both piston chambers of the hydraulic valve are neither connected to the power source nor relieved from pressure. If in this third position of the regulating valve the coupling between the hydraulic cylinder and the fluid tank is interrupted, no adjustment of the upper link is possible. However if the hydraulic cylinder is coupled to the fluid tank in this position, the piston of the hydraulic cylinder can be moved in floating fashion by a distance corresponding to the pre-determined volume and thus the position of the upper link can be changed to this extent. Movement of the piston greater than this is not permitted.

According to a further advantageous embodiment of the invention the hydraulic cylinder and the fluid tank in each case are a double action cylinder, which has two piston chambers, wherein a fluid connection can be produced between a first piston chamber of the hydraulic cylinder and a first piston chamber of the fluid tank, and wherein a fluid connection can be produced between the second piston chamber of the hydraulic cylinder and the second piston chamber of the fluid tank. Preferably a coupling valve is arranged in at least one of the fluid connections, so that as a result of this the coupling can be coupled and interrupted. Provision can also be made for a coupling valve to be arranged in each of the two fluid connections.

According to a further advantageous embodiment of the invention the hydraulic cylinder and the fluid tank in each case are formed by a double action cylinder, which has two piston chambers, wherein a fluid connection can be produced between a first piston chamber of the hydraulic cylinder and a first piston chamber of the fluid tank by means of a coupling valve, and wherein the second piston chamber of the hydraulic cylinder and the second piston chamber of the fluid tank are formed by a common piston chamber, which is limited both by a displaceable piston of the fluid tank and by a displaceable piston of the hydraulic cylinder. As a result the hydraulic cylinder and the fluid tank are accommodated in an especially space-saving manner. Furthermore provision is made for the fluid tank, in addition to the double action cylinder integrated in the hydraulic cylinder, to have another external double action cylinder, which is coupled to the hydraulic cylinder such as described a paragraph above.

According to a further advantageous embodiment of the invention the upper link is split over its length into two, wherein a first part of the upper link is connected to the piston of the hydraulic cylinder and a second part of the upper link is connected to a cylinder of the hydraulic cylinder, so that the upper link can be adjusted in its length by the hydraulic cylinder. Here "coupled" means that the first part or the second part is fastened directly, or by means of further components, to the piston or to the cylinder of the hydraulic cylinder. Thus the length of the upper link can be varied in a simple manner and thus a pivot movement of the implement in relation to the utility vehicle can also be permitted in the upper link float position.

Alternatively provision may be made for the upper link at a proximal end to have a coupling point for pivotal mounting on the utility vehicle, for one end of the hydraulic cylinder to be connected or close to a distal end of the upper link and the other end of the hydraulic cylinder to have a coupling point for mounting on the utility vehicle and for the distal end of the upper link to have a coupling element for mounting on the tool-carrying frame, so that the upper link in a condition mounted on the utility vehicle can be pivotally adjusted by the hydraulic cylinder. In contrast to the length variation of the upper link, described above, through this variant the pivot position of the upper link is adjusted by the hydraulic cylinder. By suitable selection of the coupling points at the proximal end of the upper link and the hydraulic cylinder on the utility vehicle it is as a result likewise possible for the implement to be actively raised or lowered by adjusting the upper link and for limited pivoting of the implement relative to the utility vehicle to be permitted in the case of the upper link float position mode of operation.

BRIEF DESCRIPTION OF THE DRAWINGS

Further features and advantages of the invention will become clear from the description of exemplary embodiments on the basis of the appended drawings, wherein:

FIG. 6A is a cross sectional view of an upper link according to a second embodiment of the present invention;

FIG. 7 is a cross sectional view of an upper link according to a third embodiment of the present invention.

DETAILED DESCRIPTION OF PREFERRED EMBODIMENTS

The directional indications used in this description, such as for example top, bottom, left and right, relate to the reference system of a driver sitting in the utility vehicle. These directional indications are not to be interpreted in any way which is limiting for the upper link according to the invention.

In the description below of the embodiments of the present invention the same reference symbols are used for the same components, as were used in the description of FIGS. 1 and 2.

Figure 1:
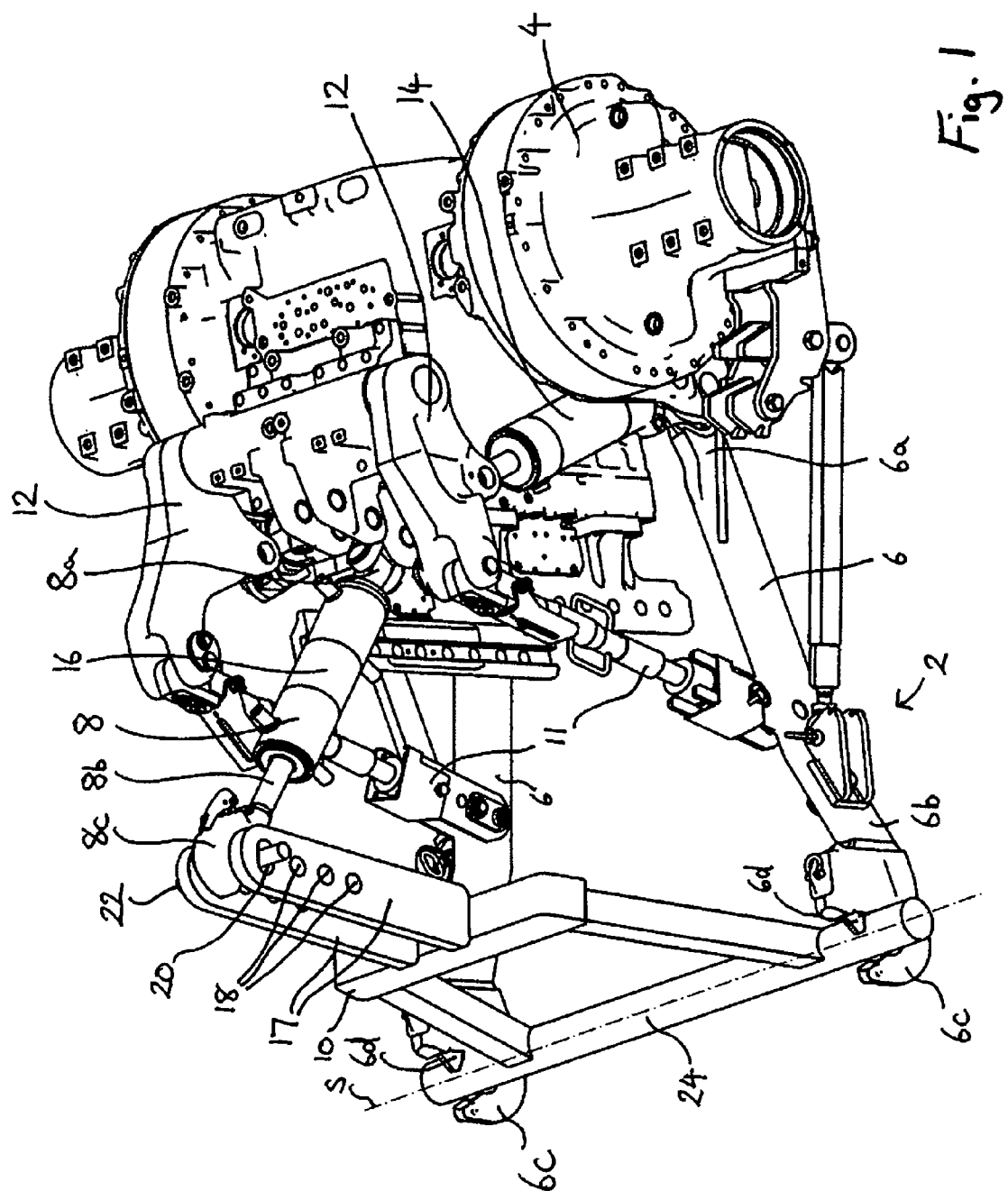
FIG. 1 is a perspective view of a conventional three-point hitch with coupled tool-carrying frame seen from the right in the driving direction.
Figure 2:
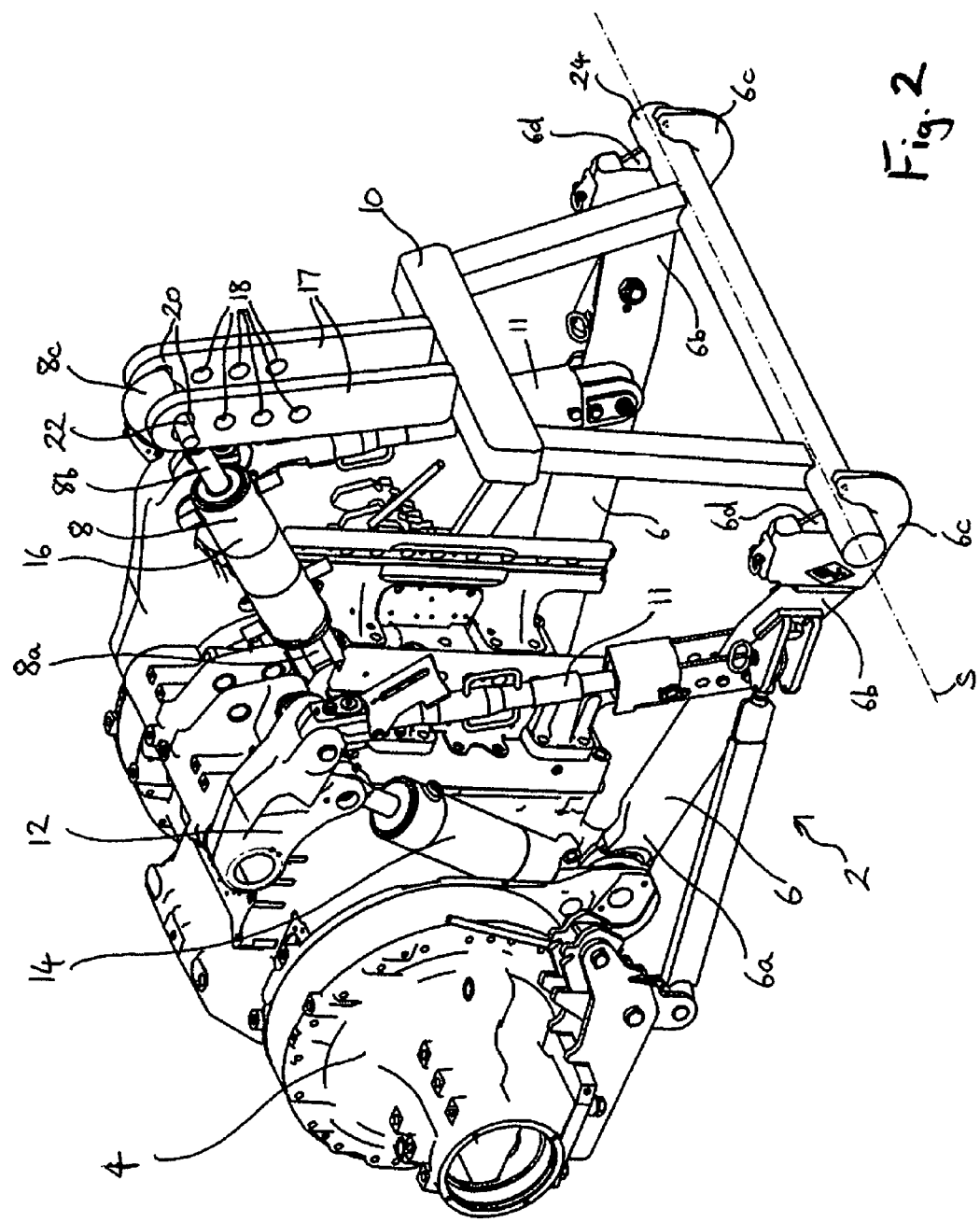
FIG. 2 is a perspective view of a conventional three-point hitch with coupled tool-carrying frame seen from the left in the driving direction.

In the following the differences compared to the arrangement, which is illustrated in FIGS. 1 and 2, are predominantly discussed. In all other respects reference is made to the description of FIGS. 1 and 2.

Figure 3:
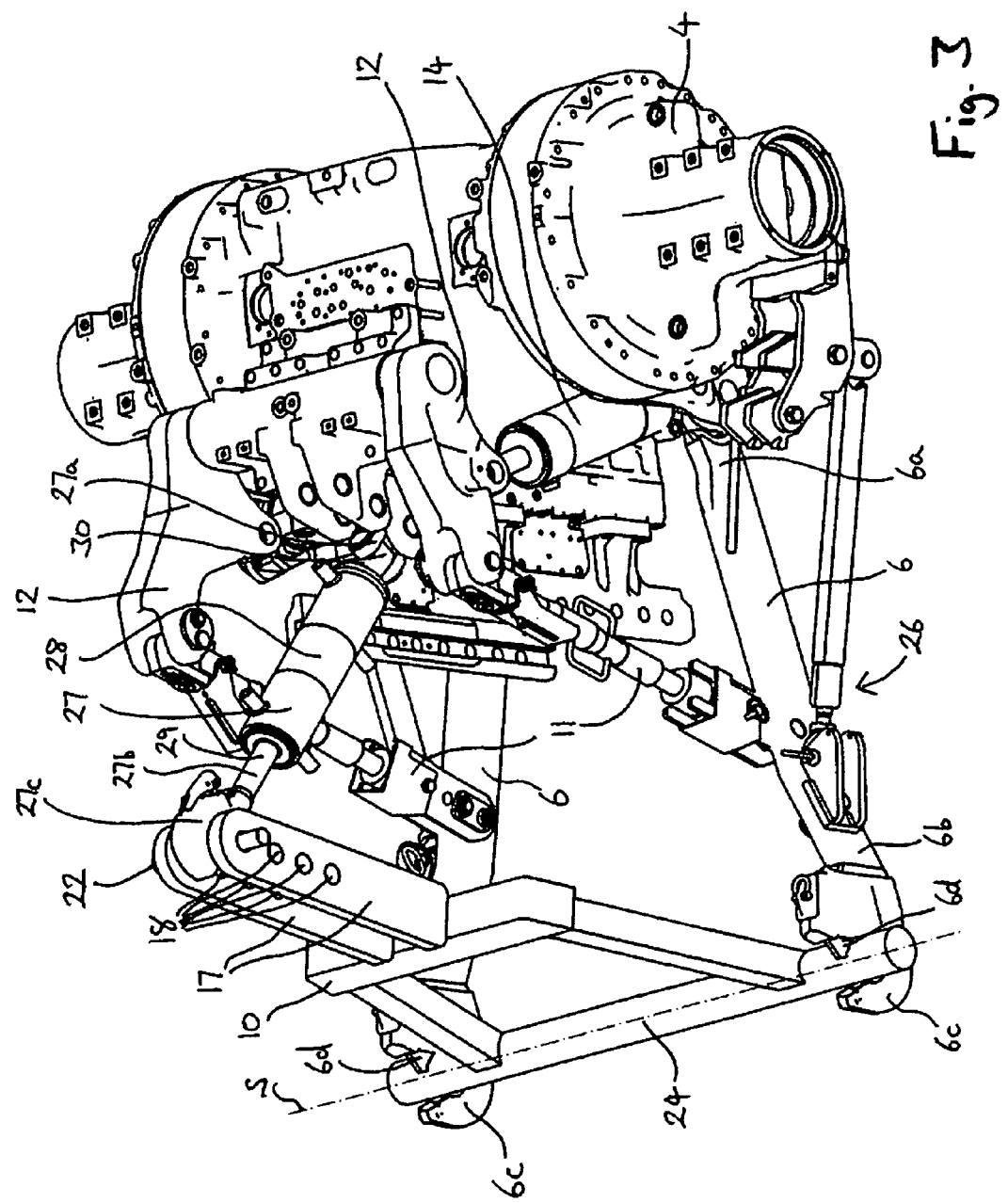
FIG. 3 is a perspective view of a three-point hitch with an upper link according to the present invention seen from the top right in the driving direction, wherein a tool-carrying frame is coupled to the three-point hitch.
Figure 4:
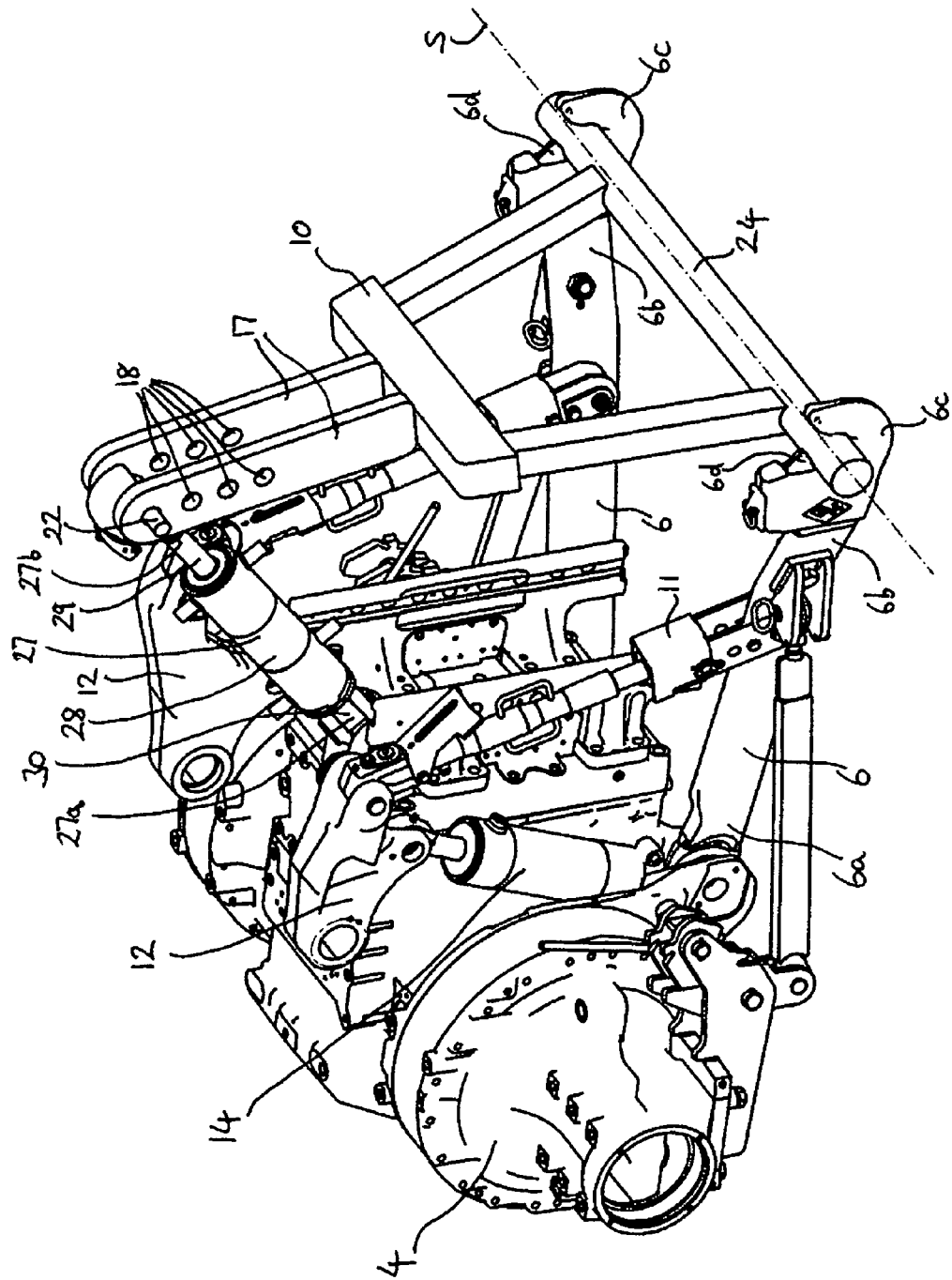
FIG. 4 is a perspective view of a three-point hitch with an upper link according to the present invention seen from the top left in the driving direction, wherein a tool-carrying frame is coupled to the three-point hitch.

FIGS. 3 and 4 show a three-point hitch 26 with an upper link 27 according to the present invention. A tool-carrying frame 10 is coupled to the three-point hitch 26. Similar to the upper link 8 illustrated in FIGS. 1 and 2 the upper link 27 is arranged with its proximal end 27a on the transmission case 4 (or possibly on a chassis part) so that it is able to pivot. The distal end 27b of the upper link 27 again has a coupling element 27c with associated engaging element (not illustrated). Furthermore the upper link 27 has a hydraulic cylinder 28 for adjusting the length of the upper link 27.

The hydraulic cylinder 28 can be coupled to a fluid tank (not illustrated in FIGS. 3 and 4), so that in the coupled condition hydraulic fluid, limited to a pre-determined volume, can be exchanged between the hydraulic cylinder and the fluid tank. Thus, as described below with reference to FIGS. 5 to 8 on the basis of three exemplary embodiments of the present invention, a piston of the hydraulic cylinder 28 can be moved in floating fashion by a distance corresponding to the pre-determined volume in the hydraulic cylinder 28. This means that in the coupled condition of the fluid tank a first part 29, linked to the piston of the hydraulic cylinder 28, of the upper link 27 can be displaced relative to a second part 30, linked to the cylinder of the hydraulic cylinder 28, of the upper link 27. If external force is exerted on the attached implement and thus on the tool-carrying frame 10 in the upwards or downwards direction, the pivot movement about the pivot axis s caused by the exertion of force can therefore be absorbed by the upper link 27.

Because the upper link float position is made available according to the invention by the hydraulic cylinder 28 being coupled to the fluid tank, it is no longer necessary, on the implement side, to provide an elongated hole on the tool-carrying frame 10. As illustrated in FIGS. 3 and 4, the connection of the upper link 27, also in the case of the mode of operation with upper link float position, can therefore be coupled to the drilled holes 18 by means of the pin 22. In particular the upper link 27 can be connected to the tool-carrying frame 10 at different heights.

Figure 5:
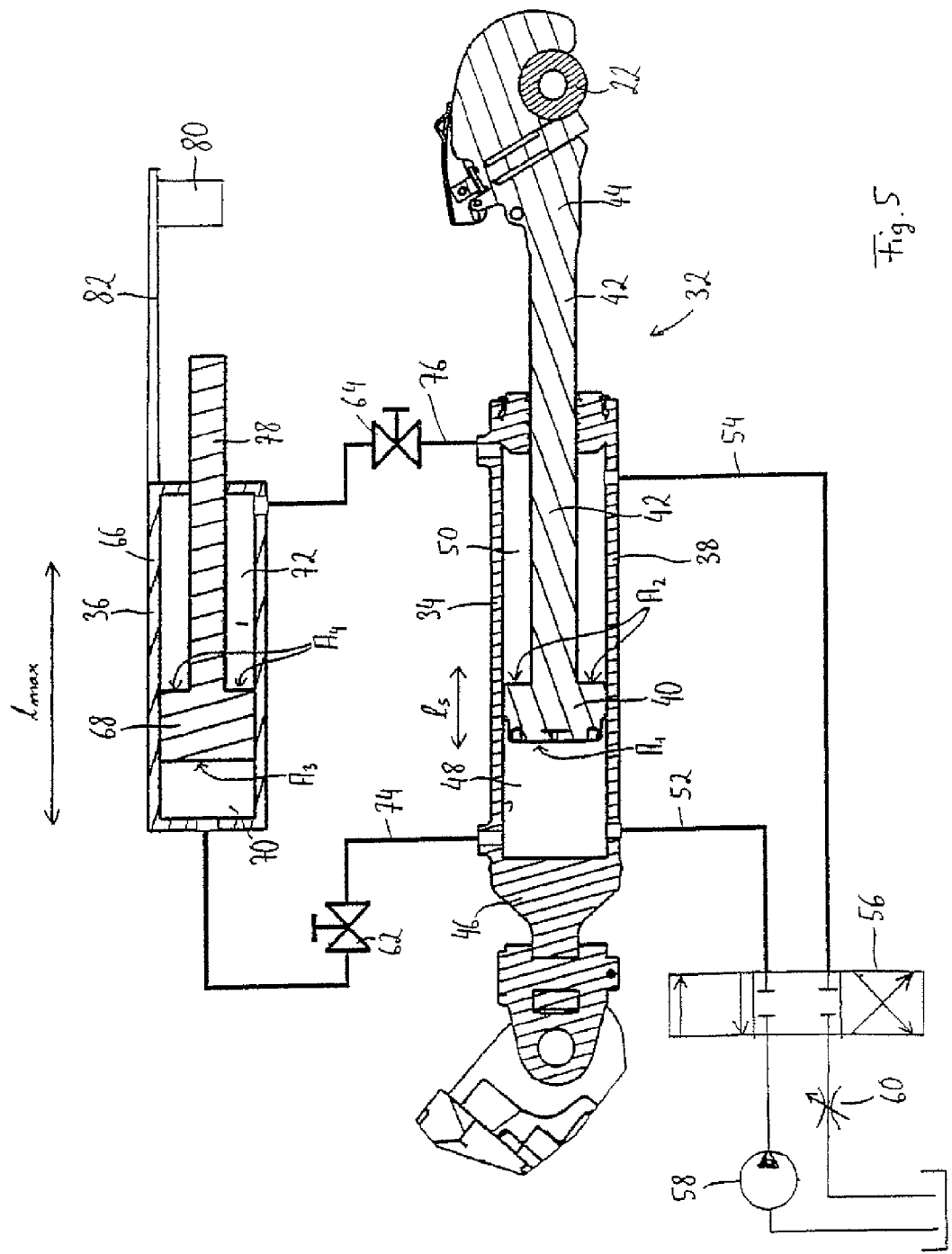
FIG. 5 is a cross sectional view of an upper link according to a first embodiment of the present invention.
Figure 9A:
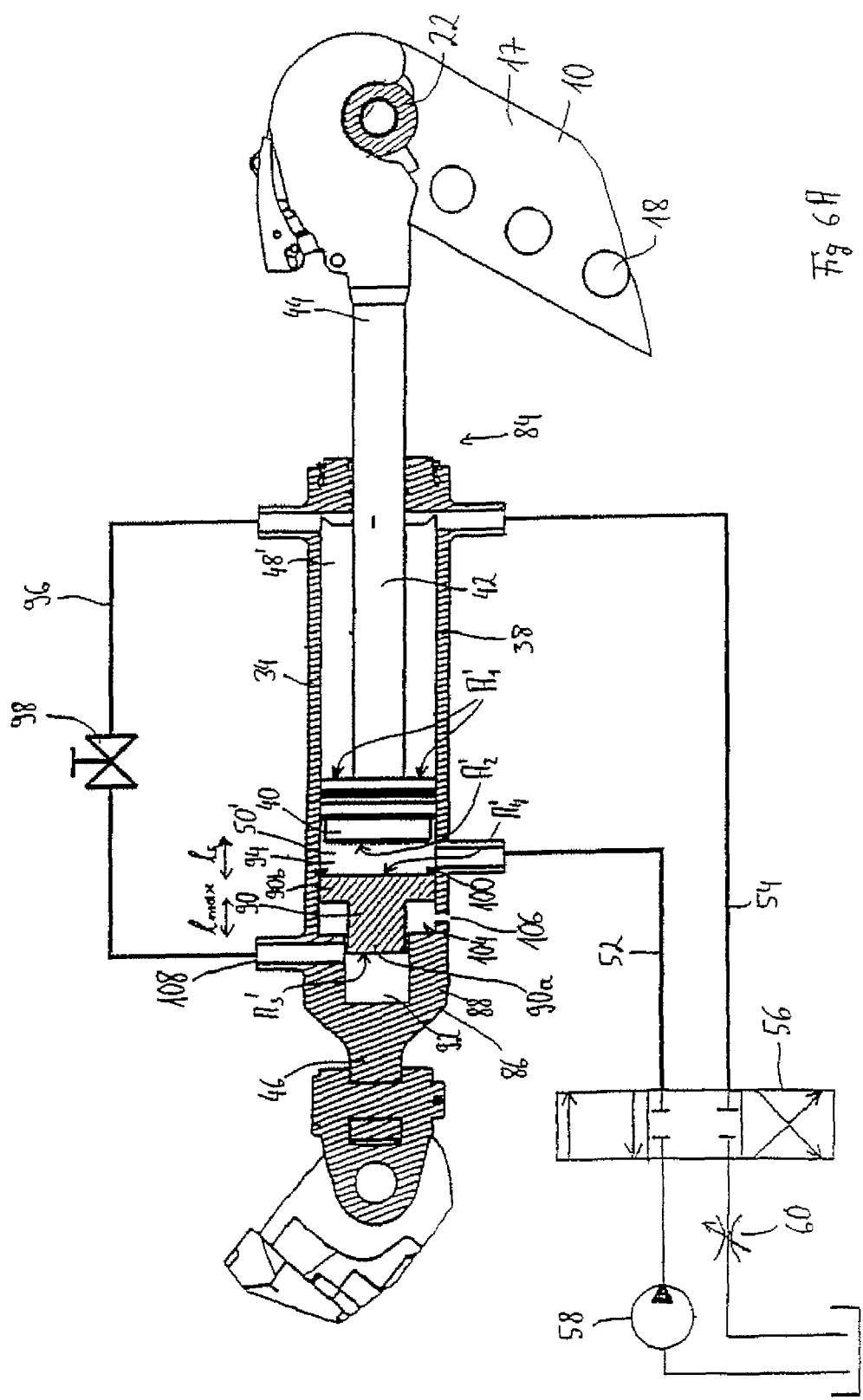

FIG. 5 shows a cross sectional view of an upper link 32, according to a first embodiment of the present invention. The upper link 32 has a hydraulic cylinder 34, which can be coupled to a fluid tank 36. The hydraulic cylinder has a cylinder 38 and a piston 40, which is arranged displaceably therein, with a piston rod 42. The upper link 32 is split over its length into two, wherein a first part 44 is connected to the piston 40 by means of the piston rod 42 and a second part 46 is connected to the cylinder 38. The upper link 32 can therefore be adjusted in its length by the hydraulic cylinder 34. The hydraulic cylinder 34 is a double action cylinder, the cylinder 38 being divided by the piston 40 into a first piston chamber 48 and a second piston chamber 50.

A fluid line 52 or 54 leads away from each of the piston chambers 48, 50. By means of a 4/3 way valve 56 with two flow positions and a closed central position, in each case one of the piston chambers 48, 50 can be connected to a power source in the form of a hydraulic pump 58, while the other of the piston chambers 48, 50 is relieved from pressure in a controlled way. Controlled relief from pressure here means that the other piston chamber 48, 50 is relieved from pressure so that the piston 40 can be adjusted in a controlled and exact way. The pressure in the case of the illustrated embodiment is relieved by a throttle valve 60 with variable cross section.

In the case of the arrangement illustrated in FIG. 5 accordingly pressure can be applied to the first piston chamber 48 and the second piston chamber 50 can be relieved from pressure in a controlled way by means of the throttle valve 60 in a lowest position of the 4/3 way valve 56, so that the piston 40 in FIG. 5 is moved in the right-hand direction. Inversely, with the arrangement illustrated in FIG. 5, pressure can be applied to the second piston chamber 50 and the first piston chamber 48 can be relieved from pressure in a controlled way by means of the throttle valve 60 in a highest position of the 4/3 way valve 56, so that the piston 40 is moved in the left-hand direction. In a central position of the 4/3 way valve the connections of the two piston chambers 48, 50 to the hydraulic pump 58 and the throttle valve 60 are interrupted. The 4/3 way valve therefore forms a regulating valve by means of which the active adjustment of the piston 40 in hydraulic cylinder 34 is regulated.

The fluid tank 36, which can be coupled by means of two coupling valves 62 and 64 via fluid lines 74 and 76 to the two piston chambers 48 and 50 of the hydraulic cylinder 34 is provided in order to make available the mode of operation with upper link float position. The fluid tank 36 is formed by a double action cylinder, which has a cylinder 66 and a piston 68 arranged displaceably therein. The cylinder 66 is divided by the piston 68 into a first piston chamber 70 and a second piston chamber 72. By opening the coupling valve 62 a fluid connection is produced from the first piston chamber 48 of the hydraulic cylinder 34 to the first piston chamber 70 of the fluid tank 36. Equally, by opening the coupling valve 64 a fluid connection is produced from the second piston chamber 50 of the hydraulic cylinder 34 to the second piston chamber 72 of the fluid tank 36. The hydraulic cylinder 34 and the fluid tank 36 are designed here as separate components.

The upper link float position is made available by common opening of the two coupling valves 62 and 64. In this position if outside forces are exerted on the implement attached to the upper link 32, the piston 40 can be moved in floating fashion by a distance, which in each case corresponds to the volume of hydraulic fluid exchanged between the hydraulic cylinder 34 and the fluid tank 36. In particular the maximum volume which can be exchanged between the first piston chamber 48 of the hydraulic cylinder 34 and the first piston chamber 70 of the fluid tank 36 is limited to the product of the maximum displacement length $l_{max}$ of the piston 68 with the surface area $A_3$ of the piston 68 of the fluid tank 36. This results in a maximum displacement length $l_s$ of the piston 40 as follows:

$$l_s = l_{max} \times A_3/A_1 \qquad (1)$$

The piston surface area $A_2$, which faces the second piston chamber 50 of the hydraulic cylinder 34, is reduced by the cross-sectional area of the piston rod 42. Equally, the surface area $A_4$ of the piston 68, which faces the second piston chamber 72 of the fluid tank 36, is reduced by the diameter of the piston rod 78. For the ratio of the surface areas $A_1$-$A_4$ the following equation applies:

$$A_1/A_2 = A_3/A_4. \qquad (2)$$

Depending on the mode of operation it can be advantageous to adjust the maximum displacement length of the piston 40 in the upper link float position to a desired amount. This is possible in a particularly simple way with a fluid tank 36 in the form of a double action cylinder. For example the maximum displacement length $l_{max}$ of the piston 68 in the fluid tank 36 can be adjusted by a movable stop 80. In FIG. 5 the adjustable stop 80 is, for example, arranged on a rail 82 and can be locked in a desired position.

If it is intended to actively move the piston 40 by corresponding application of pressure via the 4/3 way valve 56, it is usually expedient to close the two coupling valves 62 and 64 so that displacement of the piston 40 directly corresponding to the actuation is achieved.

If the piston 40 in the arrangement illustrated in FIG. 5 is actively moved to the left, that is to say, if the implement, attached to the upper link 32, is raised by hydraulic power, it may however be advantageous to open the coupling valves 62 and 64 first so that the piston 68 of the fluid tank 36 is also moved to the left at the same time. If after the upper link 32 is adjusted the 4/3 way valve 56 is subsequently brought into the closed central position, the piston 68 of the fluid tank 36 continues to be in the position completely to the left. If the implement attached to the upper link 32 makes contact with the ground or if it is raised upwards when driving over bumps, which leads to the fact that the piston 40 in FIG. 5 is moved to the left by outside exertion of force, the maximum displacement length $l_{max}$ of the piston 68 of the fluid tank 36 and consequently the maximum displacement length $l_s$ of the piston 40 of the hydraulic cylinder 34 can be exhausted. Furthermore it may also be advantageous during active movement of the piston 40 by means of the 4/3 way valve 56 to actuate the coupling valves 62 and 64 so that they are open until the piston 68 of the fluid tank 36 has reached a desired position, for example also a central position, and afterwards to close the coupling valves 62 and 64. This control can be performed by means of corresponding sensors for example.

FIG. 6A shows a second embodiment of an upper link 84 according to the present invention. The same reference symbols as those for the embodiment illustrated in FIG. 5 are used below for identical components. The differences compared to the embodiment illustrated in FIG. 5 are predominantly discussed in the following.

The upper link 84 again has a hydraulic cylinder 34 with a piston 40, which is displaceably arranged in a cylinder 38. The piston 40 divides the cylinder 38 into a first piston chamber 48' and a second piston chamber 50'. In contrast to the embodiment illustrated in FIG. 5 the piston chamber 48', in which the piston rod 42 is arranged, is designated as the first piston chamber 48'. Furthermore the piston chamber 50', in which the piston rod 42 is not arranged, is designated as the second piston chamber 50'. As described with reference to FIG. 5, the piston 40 is actively moved by connecting one of the piston chambers 48', 50' to a hydraulic pump 58. In contrast to the first embodiment, which is illustrated in FIG. 5, a fluid tank 86 is formed integrally in the upper link 84. The fluid tank 86 has a cylinder 88, which is linearly joined to the cylinder 38 of the hydraulic cylinder 34 and is formed integrally with this. Both the cylinder 88 and also a piston 90 arranged in the cylinder have a graduation along the displacement direction of the piston 90. The piston 90 divides the cylinder 88 of the fluid tank 86 into a first piston chamber 92 and a second piston chamber 94, the second piston chamber 94 of the fluid tank 86 and the second piston chamber 50' of the hydraulic cylinder 34 forming a common piston chamber, which is limited both by the displaceable piston 90 of the fluid tank 86 and by the displaceable piston 40 of the hydraulic cylinder 34.

The piston surface area $A'_4$ of the piston 90, which faces the common piston chamber 94 or 50', is the same size as the piston surface area $A'_2$ of the piston 40, which faces the common piston chamber 50' or 94. Also, the piston surface area $A'_3$ of the piston 90, which faces the first piston chamber 92 of the fluid tank 86, is the same size as the first piston surface area $A_1'$ of the piston 40, which faces the first piston chamber 48' of the hydraulic cylinder 34. The first piston chamber 48' of the hydraulic cylinder 34 can be connected by means of a fluid line 96 and a coupling valve 98 to the first piston chamber 92 of the fluid tank 86, so that a pre-determined volume of hydraulic fluid can be exchanged therebetween. In the case of the illustrated embodiment the maximum displacement length $l_{max}$ of the piston 90 is limited by a stop 100. The pre-determined volume in this case corresponds to the product of the piston surface area $A_3'$ and its maximum displacement length max. Since in the present embodiment the surface area $A_1'$ of the piston 40 is the same size as the surface area $A_3'$ of the piston 90, the maximum displacement length $l_s$ of the piston 40 corresponds to the length $l_{max}$ in the case of the surface area ratio of the present embodiment. Therefore the following equation applies:

$$l_{max}=l_s. \qquad (3)$$

Due to the graduation of the piston 90 the ratio of the surface areas $A'_1$-$A'_4$ indicated above is achieved. As illustrated in FIG. 6A, the piston 90 in particular has a section 90a of lesser diameter and a section 90b of larger diameter, the transition between these two sections being formed by a step. Accordingly the cylinder 88 of the fluid tank 86 also has a section of lesser diameter, which forms the first piston chamber 92 and in which the section 90a of lesser diameter of the piston 90 is guided in fluid-tight fashion. In the section of the cylinder 88 of larger diameter the piston section 90b of larger diameter is guided in fluid-tight fashion.

Figure 6B:
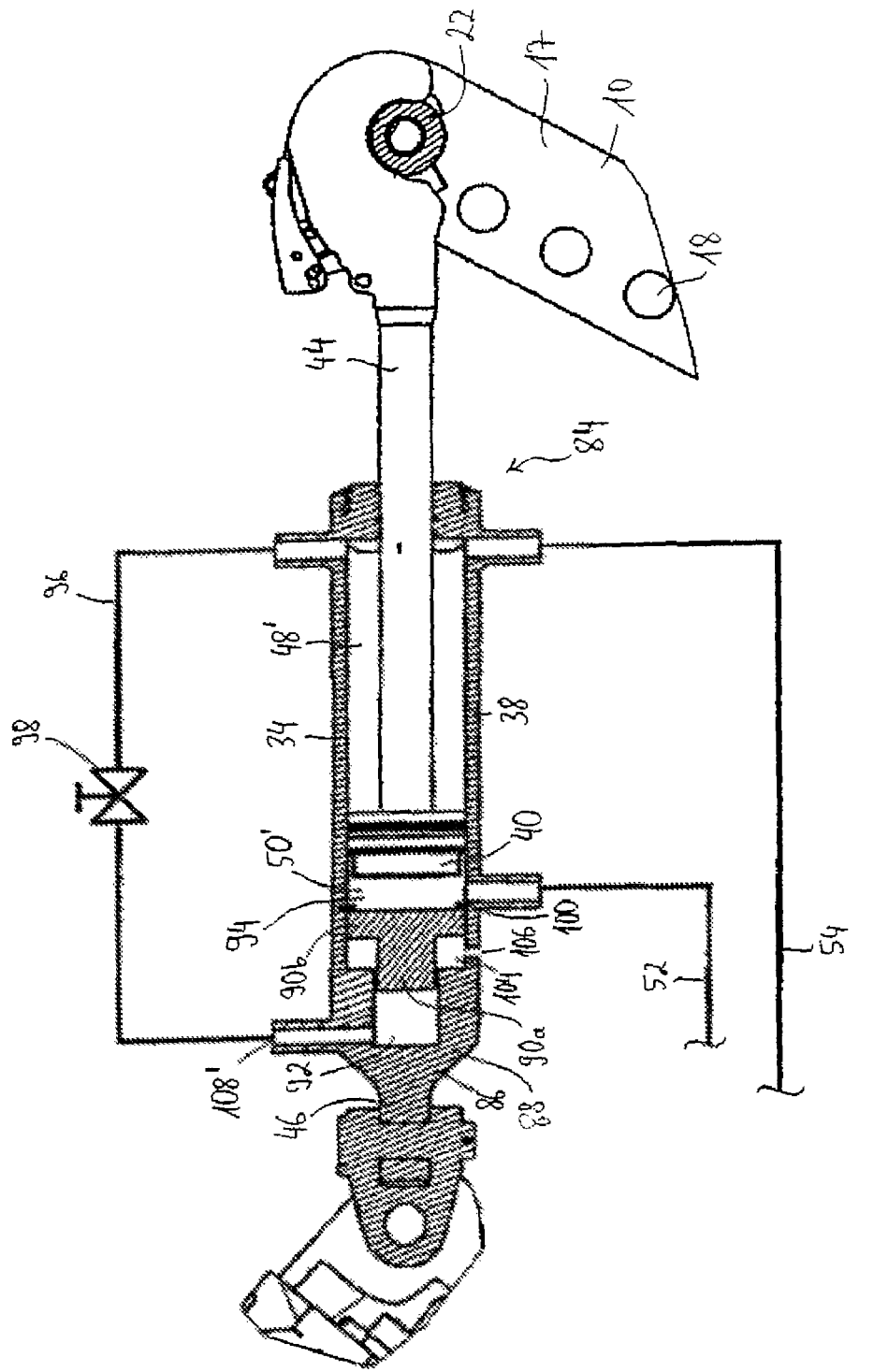
FIG. 6B is a cross sectional view of an upper link according to the view illustrated in FIG. 6A with modified position of the inlet port.

As illustrated in FIG. 6A, a gap 104 between the piston 90 and the graduated section of the cylinder 88 results through the movement of the piston 90 in FIG. 6A to the right. In order to avoid negative pressure developing in the gap 104, a vent 106 leads outwards from the gap 104. The section of lesser diameter 90a of the piston 90 lies in fluid-tight fashion against the edge of the graduation of the cylinder 88, so that the first piston chamber 92 of the fluid tank 86 is terminated in fluid-tight fashion relative to the gap 104. The section of lesser diameter 90a of the piston 90 on the side, which faces an inlet port 108 of the fluid line 96, can also have a duct, which leads towards the first piston chamber 92, in order to ensure that fluid is exchanged between the first piston chamber 92 of the fluid tank 86 and the first piston chamber 48' of the hydraulic cylinder 34. As an alternative to providing a duct, as illustrated in FIG. 6B, the inlet port 108' can be arranged at the end of the first piston chamber 92 of the fluid tank 86, which faces the piston 90. Thus fluid can be exchanged between the first piston chamber 92 of the fluid tank 86 and the first piston chamber 48' of the hydraulic cylinder 34, irrespective of the position of the piston 90. In all other respects the arrangement of FIG. 6B corresponds to the arrangement illustrated in FIG. 6A and will not be explained further.

Equally, as has been explained regarding the embodiment of FIG. 5, as illustrated in FIG. 6A, an adjustable stop, by means of which the maximum displacement length of the piston 40 can be adjusted in the upper link float position, may be provided on the piston 90. Furthermore opening and closing of the coupling valve 98 can be actuated as a function of the position of the 4/3 way valve 56.

Figure 8:
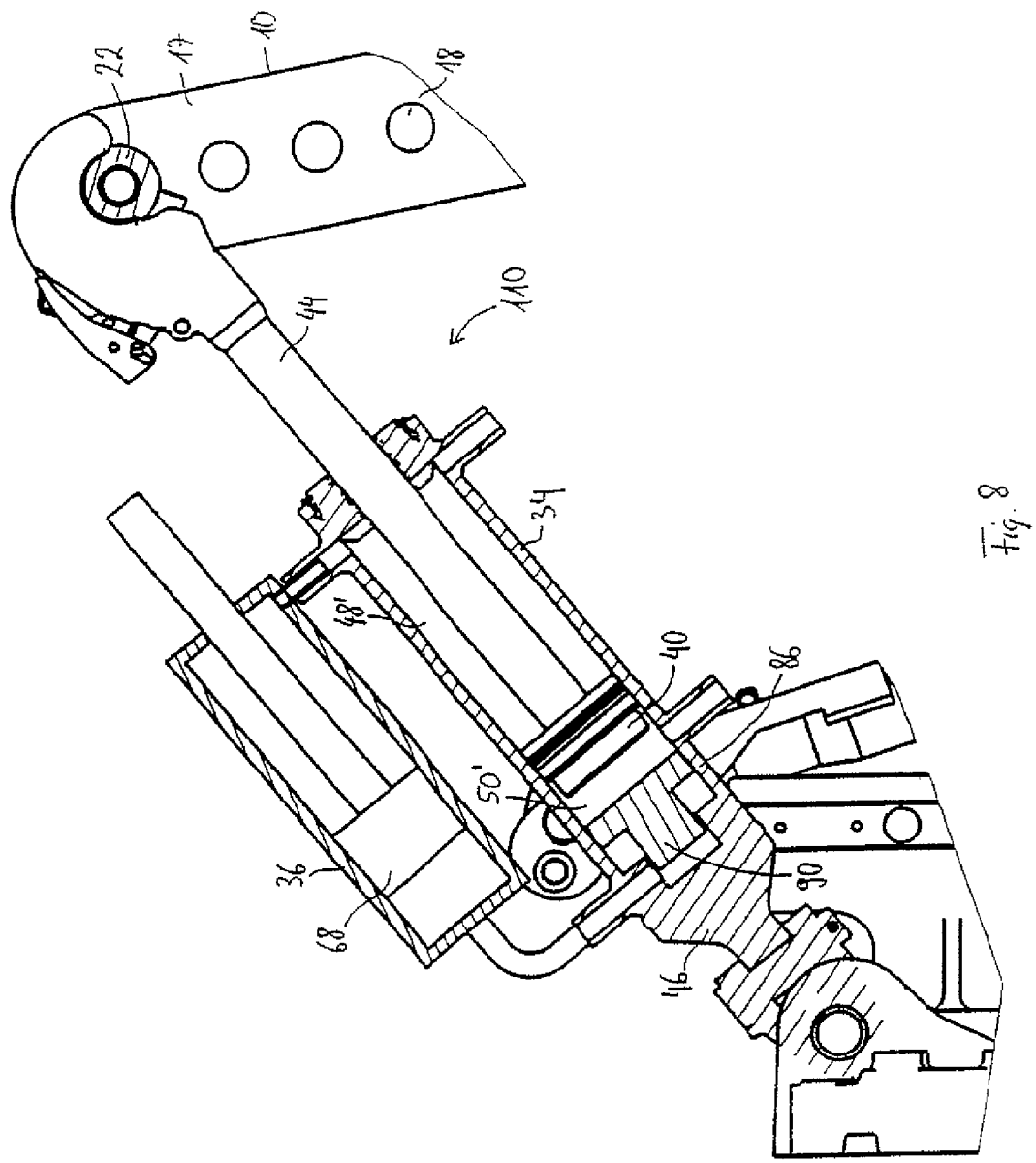
FIG. 8 is a cross sectional view of the upper link of FIG. 7 with additional fluid tank.

A third embodiment of an upper link 110 according to the invention is illustrated in FIGS. 7 and 8. The same reference symbols are again used for identical components. The upper link 110 illustrated in FIG. 7 largely corresponds to the upper link 84 illustrated in FIG. 6A according to the second embodiment. The fluid connection to a power source, such as for example a hydraulic pump, is not illustrated in FIG. 7. This however can be effected exactly the same as in the first or second embodiment. Furthermore the upper link 84 has an integrally formed fluid tank 86 similar to the fluid tank 86 of the second embodiment (see FIG. 6A). If a coupling valve is fitted in the two connections 107 and 108, which lead to the first piston chamber 48' of the hydraulic cylinder 34 and to the first piston chamber 92 of the fluid tank 86, this largely corresponds to the second embodiment.

Alternatively a further external fluid tank 36 in the form of a double action cylinder can be coupled to the two connections 107 and 108, as illustrated in FIG. 8. The external fluid tank 36 generally corresponds to the fluid tank 36 according to the first embodiment. The coupling valves are not illustrated for the sake of clarity. The pre-determined volume can be enlarged by providing the additional fluid tank, so that the maximum displacement length of the piston 40 in the hydraulic cylinder 34 can be increased. In particular it may be advantageous to provide two or more fluid tanks in order to control the coupling of each individual fluid tank separately so that different volumes for the pre-determined volume can be set accordingly.

In the embodiments of FIGS. 5 to 8 the connection to the tool-carrying frame 10 is effected in the same way as described regarding FIGS. 1 to 4. The connection of the upper link 32, 84 or 110 to the transmission case 4 or to a chassis component is effected in such a way as described regarding FIGS. 1 and 2.

The present invention is not limited to the embodiments illustrated in the figures. More particularly the fluid tank does not have to be designed as a double action cylinder. If, for example, the hydraulic cylinder of the upper link is only a single action cylinder, the fluid tank can also be designed as a single action cylinder accordingly. Also, in the case of a double action hydraulic cylinder of the upper link, each piston chamber of this hydraulic cylinder can be coupled to a separate single action cylinder as a fluid tank. In place of a single or double action cylinder as a fluid tank, a hydraulic accumulator known elsewhere, such as for example a diaphragm, which can be expanded to a pre-determined volume, can be used.

Alternatively to the embodiments illustrated in the drawings, the piston of the fluid tank can also be biased in one direction. Such bias can be produced, for example, by a spring. If a diaphragm, which is expanded to a pre-determined volume, is used for the fluid tank, a corresponding bias can be produced for example by a gas, which is contained in the pre-determined volume.

The coupling elements of the lower links and the upper link are designed in the illustrated embodiments in each case as hooks, which have an engaging element. Of course, other coupling elements can also be used. Equally, other variants of the connection of the upper link to the transmission case or to a corresponding chassis part are also possible.

In the exemplary embodiments the upper link according to the invention is part of a back-end three-point hitch of a utility vehicle. In some cases such three-point hitches are also placed at the front-end of utility vehicles. The upper link according to the invention can also be used with front-end three-point hitches.

The control and hydraulic circuit for actively moving the piston of the hydraulic cylinder are only illustrated in FIGS. 5, 6A and 6B by way of example. Of course, other hydraulic circuits and controls, by means of which the piston of the hydraulic cylinder can be actively moved, are also possible. The illustrated surface areas $A_1$-$A_4$ or $A'_1$-$A'_4$ of the embodiments are equally only by way of example. In particular it is not essential with the embodiment illustrated in FIG. 6 that the surface areas $A'_4$ and $A'_2$ are the same size and furthermore that the displacement lengths $l_{max}$ and $l_s$ are equivalent. The person skilled in the art is well aware that other surface area ratios are also feasible.

Through the expressions "fluid connection" or "interconnect" it is expressed that fluid can be exchanged between the respective components. The respective components, however, do not have to be directly connected to one another. On the contrary, other hydraulic elements, such as for example throttles, lines etc. can be installed therebetween.

I claim:

1. An upper link for a utility vehicle wherein the link includes a first double acting cylinder for adjusting the length of the link, the cylinder having first and second chambers on opposite sides of a first piston carried on a rod connected with a first end of the link, the piston being slideable within a cylinder housing connected with a second end of the link, the first and second chambers being alternatively connectable with a fluid pressure source and a sump via a regulating valve to adjust the effective length of the link, and the first and second chamber also being respectively connectable via connecting valve means to opposite sides of a second slideable piston in a second double acting cylinder so that, when said second piston is connected to the first and second chambers on opposite sides of the first piston, the first piston can float within the first double acting cylinder by a distance corresponding to the volume of fluid displaceable from the first double acting cylinder to the second double acting cylinder.

2. An upper link according to claim 1, wherein the regulating valve can also isolate the first and second chambers from the fluid pressure source and the sump.

3. An upper link according to claim 1, wherein the first and second double acting cylinders are separate components.

4. An upper link according to claim 1, wherein the second double acting cylinder has a first chamber on one side of the second piston connectable with the first chamber of the first double acting cylinder via the connecting valve means and a second chamber on the other side of the second piston which is formed as a common chamber with the second chamber of the first double acting cylinder.

5. An upper link according to claim 4, wherein the areas of the first and second pistons exposed to pressure in the common chamber are of the same size and the areas of the first and second pistons exposed to the pressure in the first chambers are also of the same size.

6. An upper link according to claim 4, wherein the first and second double acting cylinders are arranged on and more along a common axis.

7. An upper link according to claim 4, wherein the first and second double acting cylinders are formed integrally in a common housing.

8. An upper link according to claim 1, wherein one end of the link has a coupling point for mounting on a utility vehicle and the other end of the link has a coupling element for connection with an implement.

9. A utility vehicle having an upper link according to claim 8.

* * * * *